(12) United States Patent
Lu et al.

(10) Patent No.: US 11,553,465 B2
(45) Date of Patent: Jan. 10, 2023

(54) CHANNEL CONFIGURATION METHOD, COMMUNICATION NODE, AND STORAGE MEDIUM

(71) Applicant: ZTE CORPORATION, Guangdong (CN)

(72) Inventors: Zhaohua Lu, Guangdong (CN); Yijian Chen, Guangdong (CN); Huahua Xiao, Guangdong (CN); Jianxing Cai, Guangdong (CN); Yong Li, Guangdong (CN); YuNgok Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 655 days.

(21) Appl. No.: 16/497,289

(22) PCT Filed: Mar. 23, 2018

(86) PCT No.: PCT/CN2018/080261
§ 371 (c)(1),
(2) Date: Sep. 24, 2019

(87) PCT Pub. No.: WO2018/171732
PCT Pub. Date: Sep. 27, 2018

(65) Prior Publication Data
US 2020/0100231 A1    Mar. 26, 2020

(30) Foreign Application Priority Data
Mar. 24, 2017  (CN) .......................... 201710183035.7

(51) Int. Cl.
*H04W 72/04*   (2009.01)
*H04L 41/0806* (2022.01)
*H04W 28/18*   (2009.01)

(52) U.S. Cl.
CPC ..... *H04W 72/0406* (2013.01); *H04L 41/0806* (2013.01); *H04W 28/18* (2013.01); *H04W 72/0446* (2013.01)

(58) Field of Classification Search
None
See application file for complete search history.

(56) References Cited

U.S. PATENT DOCUMENTS

| 9,967,876 B2 * | 5/2018 | Horiuchi ........... H04W 72/0413 |
| 2015/0365155 A1 * | 12/2015 | Subramanian ....... H04B 7/0697 370/329 |
| 2016/0127998 A1 * | 5/2016 | Roessel ................ H04L 5/0096 370/311 |

FOREIGN PATENT DOCUMENTS

| CN | 103249162 A | 8/2013 |
| CN | 104349491 A | 2/2015 |

(Continued)

OTHER PUBLICATIONS

WIPO, International Search Report dated May 28, 2018.

*Primary Examiner* — Ajit Patel
(74) *Attorney, Agent, or Firm* — Li & Cai Intellectual Property (USA) Office

(57) ABSTRACT

A channel configuration method, a communication node and a storage medium are disclosed. The method includes: determining information about a correspondence between a first channel set and a second channel set; determining a second transmission mode set corresponding to the second channel set according to the information about the correspondence between the first channel set and the second channel set and a first transmission mode set corresponding to the first channel set; and transmitting or receiving a channel in the second channel set according to the second transmission mode set.

19 Claims, 2 Drawing Sheets

(56) References Cited

FOREIGN PATENT DOCUMENTS

| | | |
|---|---|---|
| CN | 104521301 A | 4/2015 |
| CN | 103716856 B | 3/2017 |
| CN | 103763755 B | 2/2018 |
| EP | 2675226 A1 | 12/2013 |
| EP | 2942984 A1 | 11/2015 |

\* cited by examiner

CHANNEL CONFIGURATION METHOD, COMMUNICATION NODE, AND STORAGE MEDIUM

CROSS-REFERENCE TO RELATED APPLICATION

This application is based on and claims priority to Chinese Patent Application No. 201710183035.7, filed on Mar. 24, 2017, the entire contents of which are hereby incorporated by reference.

TECHNICAL FIELD

The present disclosure relates to channel management technology in the field of information processing, and particularly, to a channel configuration method, a communication node, and a storage medium.

BACKGROUND 5G (5th-Generation) can meet the diversified service needs of people in areas such as a residential area, a working area, a leisure area and a transportation area, and can provide users with ultimate experiences of services, such as ultra-high-definition video, virtual reality, augmented reality, cloud desktop, online games and the like, even in scenarios having characteristics of ultra-high traffic density, ultra-high connection density and ultra-high mobility, such as dense residential areas, offices, stadiums, open air gatherings, subways, expressways, high-speed rails and wide-area coverage. At the same time, 5G will penetrate into the Internet of Things and various industries, and deeply integrate with industrial facilities, medical instruments, transportations and the like to effectively meet the diversified service needs of vertical industries such as industry, medical care, and transportation, and achieve real "internet of everything".

Different from the traditional mobile communication systems, in the 5G system design, in order to increase the system coverage and capacity, especially for the high-frequency system, an important concept of beam (which can also be expressed as a quasi-co-location relationship) is introduced, which may be an analog beam, a digital beam, a hybrid beam, etc. Each communication node can generate a plurality of transmission beams and reception beams, and it is required to select a pair of transmission/reception beams that meet the communication quality requirements to communicate between communication nodes. Different channels between two communication nodes may have a same pair of transmission/reception beams. Different channels may also have different pairs of transmission/reception beams in order to increase scheduling flexibility. However, a complete solution has not yet been given for how to flexibly use the transmission modes (e.g., transmission beams, and/or reception beams) for different channels according to the actual channel environment.

SUMMARY

Embodiments of the present disclosure provide a channel configuration method, a communication node and a storage medium that can at least solve the above problems in the existing art.

An embodiment of the present disclosure provides a channel configuration method applied to a communication node and including: determining information about a correspondence between a first channel set and a second channel set; determining a second transmission mode set corresponding to the second channel set according to the information about the correspondence between the first channel set and the second channel set and a first transmission mode set corresponding to the first channel set; and transmitting or receiving a channel in the second channel set according to the second transmission mode set.

An embodiment of the present disclosure provides a channel configuration method applied to a communication node and including: within a time period having a first sub-time period and a second sub-time period, configuring the communication node to transmit or receive a channel set by using a first transmission mode set in the first sub-time period; and configuring the communication node to transmit or receive the channel set by using a second transmission mode set in the second sub-time period; wherein an intersection of the first sub-time period and the second sub-time period is a null set, a starting time of the first sub-time period is earlier than a starting time of the second sub-time period, an ending time of the first sub-time period is later than an ending time of the second sub-time period, and the transmission mode includes a transmission manner and/or a reception manner.

An embodiment of the present disclosure provides a channel configuration method applied to a communication node and including: configuring a target transmission mode set for a target channel set in each of N time periods, where N is a positive integer; and determining a transmission mode used in transmitting the target channel set in a corresponding time period, according to the target transmission mode set in each of the N time periods.

An embodiment of the present disclosure provides a communication node, includes: a configuration unit configured to determine information about a correspondence between a first channel set and a second channel set, and determine a second transmission mode set corresponding to the second channel set according to the correspondence between the first channel set and the second channel set and a first transmission mode set corresponding to the first channel set; and a transmission unit configured to transmit or receive a channel in the second channel set according to the second transmission mode set.

An embodiment of the present disclosure provides a communication node, including: a configuration unit configured to, within a time period having a first sub-time period and a second sub-time period, configure the communication node to transmit or receive a channel set by using a first transmission mode set in the first sub-time period; and configure the communication node to transmit or receive the channel set by using a second transmission mode set in the second sub-time period; wherein an intersection of the first sub-time period and the second sub-time period is a null set, a starting time of the first sub-time period is earlier than a starting time of the second sub-time period, an ending time of the first sub-time period is later than an ending time of the second sub-time period, and the transmission mode includes a transmission manner and/or a reception manner.

An embodiment of the present disclosure provides a communication node, including: a configuration unit configured to configure a target transmission mode set for a target channel set in each of N time periods; and a transmission unit configured to transmit the target channel set in the N time periods, according to the target transmission mode set in each time period.

An embodiment of the present disclosure provides a storage medium storing computer-executable instructions configured to perform the above methods.

The present disclosure further provides a communication node, including a processor and a storage, the storage storing a computer program that is executable on the processor, wherein the processor is configured to, when executing the computer program, perform a step of the method in the above embodiment.

The embodiments of the present disclosure provide a channel configuration method, a communication node and a storage medium that can flexibly configure the transmission mode set corresponding to the channel set, and the transmission modes can be flexibly configured for the channels in the channel set, thereby solving the problem of variation of transmission of the control channel and transmission mode due to the diversity of environments of the channel in the communication system, and improving the performance of the mobile communication system.

BRIEF DESCRIPTION OF THE DRAWINGS

FIG. 1-2 is a second flow chart illustrating a channel configuration method according to an embodiment of the present disclosure;

FIG. 2 is a schematic diagram illustrating a correspondence between channels in a channel set according to an embodiment of the present disclosure;

DETAILED DESCRIPTION

It should be noted that the specific embodiments described herein are merely used for explaining the present disclosure, rather than limiting the present disclosure.

Embodiment One

Figure 1:
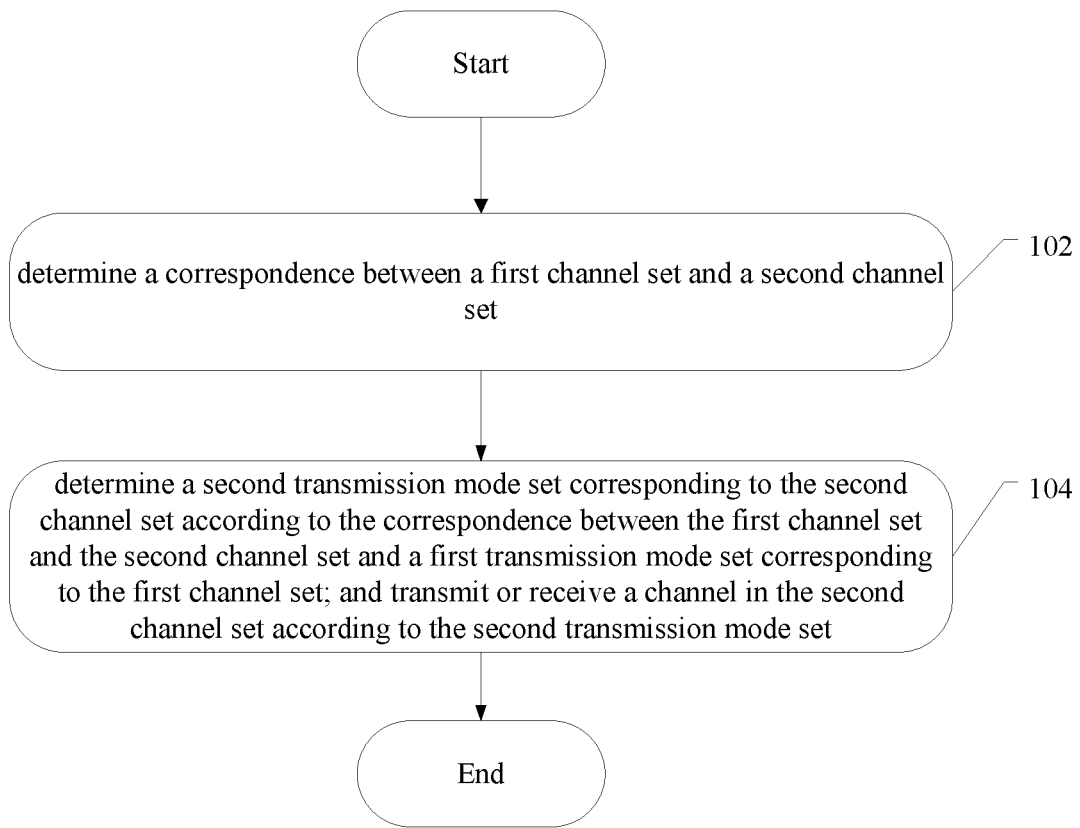
FIG. 1-1 is a first flow chart illustrating a channel configuration method according to an embodiment of the present disclosure.

The present embodiment of the present disclosure provides a channel configuration method applied to a communication node, and as illustrated in FIG. 1-1, including: step 102 of determining information about a correspondence between a first channel set and a second channel set; step 104 of determining a second transmission mode set corresponding to the second channel set according to the correspondence between the first channel set and the second channel set and a first transmission mode set corresponding to the first channel set; and transmitting or receiving a channel in the second channel set according to the second transmission mode set.

The first channel set includes an uplink channel and/or a downlink channel. The target channel set (i.e., the second channel set) includes an uplink channel and/or a downlink channel.

The numbers of elements in the first channel set, the target channel set, the first transmission mode set and the second transmission mode set are A, B, C and D, respectively, where each of A, B, C and D is an integer larger than 0.

The transmission mode includes a transmission manner and/or a reception manner.

Next, the channel configuration method illustrated in the above schematic diagram will be described in detail below in connection with various examples.

Example One

In an exemplary embodiment, the first channel set includes an uplink channel and/or a downlink channel; and the target channel set includes an uplink channel and/or a downlink channel.

In an exemplary embodiment, the numbers of elements in the first channel set, the target channel set, the first transmission mode set and the second transmission mode set are A, B, C and D, respectively, where each of A, B, C and D is an integer larger than 0. Further, A, B, C and D may be the same or may be different.

Example Two

In the step 102 of determining information about a correspondence between a first channel set and a target channel set, a channel in the first channel set is pre-configured, or is obtained by the communication node negotiating with another communication node; a channel in the target channel set is pre-configured, or is obtained by the communication node negotiating with another communication node; the correspondence between the first channel set and the target channel set is pre-configured, or is obtained by the communication node negotiating with another communication node.

Example Three

In the step 102 of determining information about a correspondence between a first channel set and a target channel set, in a case where the first channel set includes at least a physical uplink data channel, the target channel set includes at least a physical uplink control channel.

Figures 1, 2:
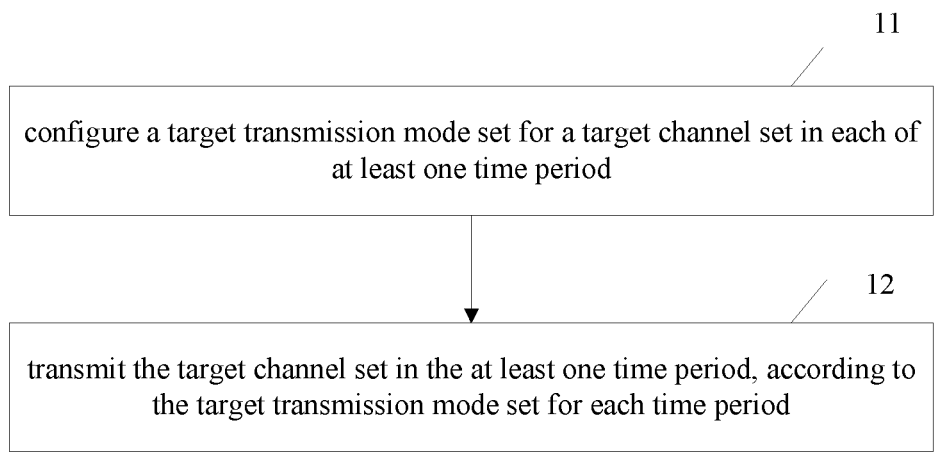
Figure 2:
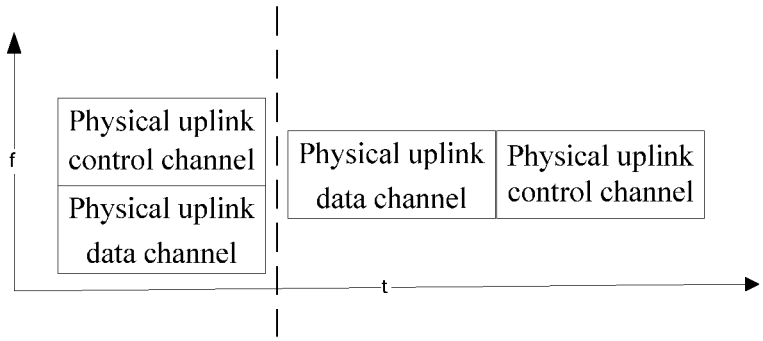

As illustrated in FIG. 2 and referring to the right side thereof, the starting position of a time domain of the resource used by the physical uplink data channel is not later than the starting position of a time domain of the resource used by the physical uplink control channel; alternatively, referring to the left side of FIG. 2, the resource used by the physical uplink data channel is allocated in the same time slot as the resource used by the physical uplink control channel.

Example Four

The information about the correspondence between the first channel set and the target channel set is determined. In an exemplary embodiment, the first channel set includes at least a physical downlink data channel, and the target channel set includes at least a physical uplink control channel.

The starting position of a time domain of the resource used by the physical downlink data channel is not later than the starting position of a time domain of the resource used by the physical uplink control channel; alternatively, the resource used by the physical downlink data channel is allocated in the same time slot as the resource used by the physical uplink control channel; alternatively, the physical uplink control channel carries content about the physical downlink data channel.

That is to say, the first channel set may include a channel having a direction different from that of a channel in the target channel set. For example, the first channel set in the present embodiment includes the physical downlink data channel, and the target channel set includes the physical uplink control channel.

Example Five

The information about the correspondence between the first channel set and the target channel set is determined. In an exemplary embodiment, the first channel set includes at least a physical downlink control channel, the target channel set includes at least a physical uplink control channel, the starting position of a time domain of the resource used by the physical downlink control channel is not later than the starting position of a time domain of the resource used by the physical uplink control channel; alternatively, the resource used by the physical downlink control channel is allocated in the same time slot as the resource used by the physical uplink control channel; alternatively, the physical uplink control channel carries content about a physical downlink data channel allocated by the physical downlink control channel.

The second transmission mode set for the target channel set is determined according to the first transmission mode set for the first channel set, and the communication node transmits or receives a channel in the target channel set according to the second transmission mode set.

Example Six

The information about the correspondence between the first channel set and the target channel set is determined. In an exemplary embodiment, the first channel set includes at least one or a combination of a physical random access channel and a physical uplink data channel, the target channel set includes at least a physical uplink control channel, and the starting position of a time domain of the resource used by the physical uplink data channel is not later than the starting position of a time domain of the resource used by the physical uplink control channel.

Example Seven

The information about the correspondence between the first channel set and the target channel set is determined. In an exemplary embodiment, the first channel set includes at least a physical downlink control channel, the target channel set includes at least a physical downlink data channel, the starting position of a time domain of the resource used by the physical downlink control channel is not later than the starting position of a time domain of the resource used by the physical downlink data channel; alternatively, the physical downlink control channel allocates the resource used by the physical downlink data channel.

Example Eight

The information about the correspondence between the first channel set and the target channel set is determined. In an exemplary embodiment, the correspondence between the first channel set and the target channel set includes at least one of:

a correspondence between a channel in the first channel set and a channel in the target channel set;

an effective time of the correspondence between the first channel set and the target channel set;

an expiration time of the correspondence between the first channel set and the target channel set; and a correspondence rule between a channel in the first channel set and a channel in the target channel set.

For example, in a case where the first channel set includes an uplink data channel and a downlink control channel and the target channel set includes an uplink control channel, the communication node preferably determines a transmission mode of the uplink control channel according to a transmission mode of the uplink data channel.

The correspondence between the channels in the first channel set and the channels in the target channel set may be preset.

The correspondence rule may be, for example, an uplink channel in the first channel set corresponding to a downlink channel in the target channel set, or a physical downlink control channel in the first channel set corresponding to a physical downlink data channel in the target channel set. Additionally, the correspondence rule may also characterize a correspondence between time slots for the channels, or a correspondence between frequencies of the channels, etc. It may be set according to practical situations and will not be listed here one by one.

In an exemplary embodiment, the communication node may be notified of the information about the correspondence through physical layer signaling (signal) or high-level signaling. Alternatively, the information about the correspondence may be predefined.

The second transmission mode set for the target channel set is determined according to the first transmission mode set for the first channel set, and the communication node transmits or receives a channel in the target channel set according to the second transmission mode set.

Example Nine

The information about the correspondence between the first channel set and the target channel set is determined.

The second transmission mode set for the target channel set is determined according to the first transmission mode set for the first channel set, and the communication node transmits or receives a channel in the target channel set according to the second transmission mode set. In an exemplary embodiment, the transmission mode includes a transmission manner and/or a reception manner. In an exemplary embodiment, the transmission manner includes at least one of: transmission pre-coding matrix set, transmission beam set, transmission quasi-co-location relationship set, and transmission power control.

It can be seen that, by employing the above solutions, the transmission mode set corresponding to the channel set can be flexibly configured, and the transmission modes can be flexibly configured for the channels in the channel set, thereby solving the problem of variation of transmission of the control channel and transmission mode due to the diversity of environments of the channel in the communication system, and improving the performance of the mobile communication system.

Embodiment Two

The present embodiment of the present disclosure provides a channel configuration method, applied to a communication node, and as illustrated in FIG. 1-2, including step 11 of configuring a target transmission mode set for a target channel set in each of N time periods, where N is a positive integer; step 12 of determining a transmission mode used in transmitting the target channel set in a corresponding time period, according to the target transmission mode set in each of the N time periods.

It should be noted that the communication node may be any apparatus having a communication function, such as a network node (e.g., a base station) or a terminal device (e.g., a mobile phone or other terminal devices that are capable of connecting to a communication network).

Further, the N time periods may include only one target time period, or may include two or more time periods. In a case where the N time periods include only one target time period, it may refer to a time duration of the whole communication process, or it may also refer to a cycle, that is to say, prior to each cycle, the communication node performs an operation of determining the target transmission modes of channels in the target channel set once so that the target transmission modes of the target channel set can be adjusted in each cycle. In a case where the N time periods include two or more time periods, the transmission modes may be configured for different time periods, respectively, and the detailed description thereof will be explained in the following embodiments.

In an exemplary embodiment, the correspondence between the first channel set and the target channel set is determined, and according to the first transmission mode set corresponding to the first channel set, the target transmission mode set corresponding to the target channel set is determined according to the first transmission mode set. The step of determining a transmission mode used in transmitting the target channel set in a corresponding time period, according to the target transmission mode set in each of the N time periods, includes: transmitting or receiving a channel in the target channel set according to the target transmission mode set in the corresponding time period.

The first channel set includes an uplink channel and/or a downlink channel. The target channel set includes an uplink channel and/or a downlink channel.

The numbers of elements in the first channel set, the target channel set, the first transmission mode set and the second transmission mode set are A, B, C and D, respectively, where each of A, B, C and D is an integer larger than 0.

The transmission mode includes a transmission manner and/or a reception manner.

Next, the channel configuration method illustrated in the above schematic diagram will be described in detail below in connection with various examples.

Example One

In an exemplary embodiment, the first channel set includes an uplink channel and/or a downlink channel; and the target channel set includes an uplink channel and/or a downlink channel.

In an exemplary embodiment, the numbers of elements in the first channel set, the target channel set, the first transmission mode set and the second transmission mode set are A, B, C and D, respectively, where each of A, B, C and D is an integer larger than 0. Further, A, B, C and D may be the same or may be different.

Example Two

In the step 102 of determining information about a correspondence between a first channel set and a target channel set, a channel in the first channel set is pre-configured, or is obtained by the communication node negotiating with another communication node; a channel in the target channel set is pre-configured, or is obtained by the communication node negotiating with another communication node; the correspondence between the first channel set and the target channel set is pre-configured, or is obtained by the communication node negotiating with another communication node.

Example Three

In the step 102 of determining information about a correspondence between a first channel set and a target channel set, in a case where the first channel set includes at least a physical uplink data channel, the target channel set includes at least a physical uplink control channel.

As illustrated in FIG. 2 and referring to the right side thereof, the starting position of a time domain of the resource used by the physical uplink data channel is not later than the starting position of a time domain of the resource used by the physical uplink control channel; alternatively, referring to the left side of FIG. 2, the resource used by the physical uplink data channel is allocated in the same time slot as the resource used by the physical uplink control channel.

Example Four

The information about the correspondence between the first channel set and the target channel set is determined. In an exemplary embodiment, the first channel set includes at least a physical downlink data channel, and the target channel set includes at least a physical uplink control channel.

The starting position of a time domain of the resource used by the physical downlink data channel is not later than the starting position of a time domain of the resource used by the physical uplink control channel; alternatively, the resource used by the physical downlink data channel is allocated in the same time slot as the resource used by the physical uplink control channel; alternatively, the physical uplink control channel carries content about the physical downlink data channel.

That is to say, the first channel set may include a channel having a direction different from that of a channel in the target channel set. For example, the first channel set in the present embodiment includes the physical downlink data channel, and the target channel set includes the physical uplink control channel.

Example Five

The information about the correspondence between the first channel set and the target channel set is determined. In an exemplary embodiment, the first channel set includes at least a physical downlink control channel, the target channel set includes at least a physical uplink control channel, the starting position of a time domain of the resource used by the physical downlink control channel is not later than the starting position of a time domain of the resource used by the physical uplink control channel; alternatively, the resource used by the physical downlink control channel is allocated in the same time slot as the resource used by the physical uplink control channel; alternatively, the physical uplink control channel carries content about a physical downlink data channel allocated by the physical downlink control channel.

The second transmission mode set for the target channel set is determined according to the first transmission mode set for the first channel set, and the communication node transmits or receives a channel in the target channel set according to the second transmission mode set.

Example Six

The information about the correspondence between the first channel set and the target channel set is determined. In an exemplary embodiment, the first channel set includes at least a physical random access channel, the target channel set includes at least one or a combination of a physical uplink control channel and a physical uplink data channel, and the starting position of a time domain of the resource used by the physical uplink data channel is not later than the starting position of a time domain of the resource used by the physical uplink control channel.

Example Seven

The information about the correspondence between the first channel set and the target channel set is determined. In an exemplary embodiment, the first channel set includes at least a physical downlink control channel, the target channel set includes at least a physical downlink data channel, the starting position of a time domain of the resource used by the physical downlink control channel is not later than the starting position of a time domain of the resource used by the physical downlink data channel; alternatively, the physical downlink control channel allocates the resource used by the physical downlink data channel.

Example Eight

The information about the correspondence between the first channel set and the target channel set is determined. In an exemplary embodiment, the correspondence between the first channel set and the target channel set includes at least one of:

a correspondence between a channel in the first channel set and a channel in the target channel set;

an effective time of the correspondence between the first channel set and the target channel set;

an expiration time of the correspondence between the first channel set and the target channel set; and a correspondence rule between a channel in the first channel set and a channel in the target channel set.

For example, in a case where the first channel set includes an uplink data channel and a downlink control channel and the target channel set includes an uplink control channel, the communication node preferably determines a transmission mode of the uplink control channel according to a transmission mode of the uplink data channel.

The correspondence between the channels in the first channel set and the channels in the target channel set may be preset.

The correspondence rule may be, for example, an uplink channel in the first channel set corresponding to a downlink channel in the target channel set, or a physical downlink control channel in the first channel set corresponding to a physical downlink data channel in the target channel set. Additionally, the correspondence rule may also characterize a correspondence between time slots for the channels, or a correspondence between frequencies of the channels, etc. It may be set according to practical situations and will not be listed here one by one.

In an exemplary embodiment, the communication node may be notified of the information about the correspondence through physical layer signaling (signal) or high-level signaling. Alternatively, the information about the correspondence may be predefined.

The second transmission mode set for the target channel set is determined according to the first transmission mode set for the first channel set, and the communication node transmits or receives a channel in the target channel set according to the second transmission mode set.

Example Nine

The information about the correspondence between the first channel set and the target channel set is determined.

The second transmission mode set for the target channel set is determined according to the first transmission mode set for the first channel set, and the communication node transmits or receives a channel in the target channel set according to the second transmission mode set. In an exemplary embodiment, the transmission mode includes a transmission manner and/or a reception manner. In an exemplary embodiment, the transmission manner includes at least one of: transmission pre-coding matrix set, transmission beam set, transmission quasi-co-location relationship set, and transmission power control.

It can be seen that, by employing the above solutions, the transmission mode set corresponding to the channel set can be flexibly configured, and the transmission modes can be flexibly configured for the channels in the channel set, thereby solving the problem of variation of transmission of the control channel and transmission mode due to the diversity of environments of the channel in the communication system, and improving the performance of the mobile communication system.

Embodiment Three

In the present embodiment, the N time periods include a first time period and a second time period. It should be noted that although two time periods are exemplified in the present embodiment, there may be more time periods in actual cases, for example, the N time periods may further include a third time period, a fourth time period, or the like. The correspondence between channel sets and the transmission mode sets in other time periods may be configured in the same manner as in the first and second time periods, and will not be repeated here.

The channel configuration method provided in the present embodiment may include: within a time period having a first sub-time period and a second sub-time period, configuring the communication node to transmit or receive a channel set by using a first transmission mode set in the first sub-time period; and configuring the communication node to transmit or receive the channel set by using a second transmission mode set in the second sub-time period. The intersection of the first sub-time period and the second sub-time period is a null set, the starting time of the first sub-time period is earlier than the starting time of the second sub-time period, the ending time of the first sub-time period is later than the ending time of the second sub-time period, and the transmission mode includes a transmission manner and/or a reception manner.

Figure 3:
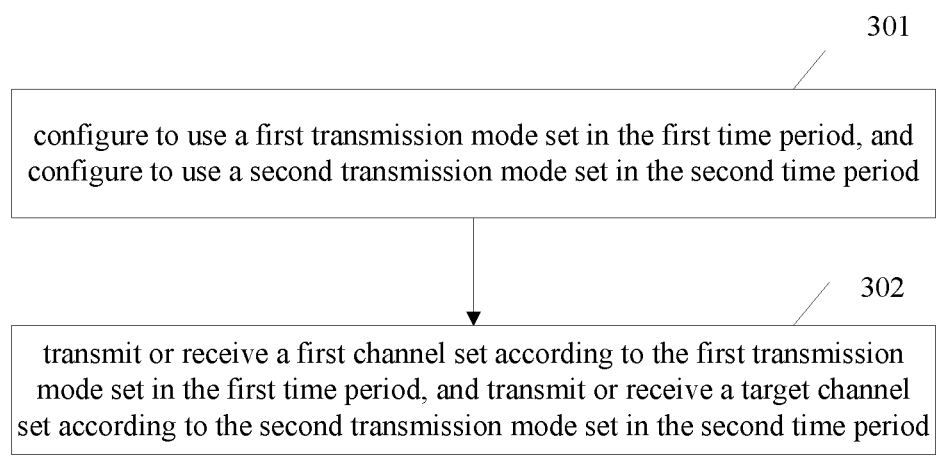
FIG. 3 is a third flow chart illustrating a channel configuration method according to an embodiment of the present disclosure.

As illustrated in FIG. 3, in an implementation, the method includes: step 301 of configuring to use a first transmission mode set in the first time period, and configuring to use a second transmission mode set in the second time period; step 302 of transmitting or receiving a first channel set according to the first transmission mode set in the first time period, and transmitting or receiving a target channel set according to the second transmission mode set in the second time period.

Within a time period having the first time period and the second time period, the communication node is configured to transmit or receive a channel set by using the first transmission mode set in the first time period; and the communication node is configured to transmit or receive the channel set by using a second transmission mode set in the second time period.

Figure 4:
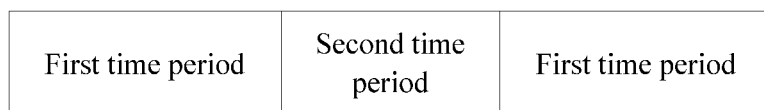
FIG. 4 is a schematic diagram illustrating a relationship among a plurality of time periods according to an embodiment of the present disclosure.

In an exemplary embodiment, as illustrated in FIG. 4, the intersection of the first time period and the second time period is a null set, the starting time of the first time period is earlier than the starting time of the second time period, the ending time of the first time period is later than the ending time of the second time period, and the transmission mode includes a transmission manner and/or a reception manner. The first time period, as illustrated in FIG. 4, may be adjacent to the second time period; alternatively, the first time period and the second time period, different from those in FIG. 4, may be not adjacent to each other in a time domain, but be spaced apart by a certain time period. In the present embodiment, whether a plurality of time periods are adjacent to each other or spaced apart from each other in a time domain is not limited.

Next, the scenarios provided by the present embodiment will be described in detail below in connection with various examples.

Example One

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the first time period and the second time period are predefined, or are obtained by the communication node negotiating with another communication node.

Example Two

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the first transmission mode set is configured to the communication node by signaling (any one or a combination of RRC (Radio Resource Control) signaling, MAC (Media Address Control) layer signaling and physical layer signaling).

Example Three

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the second transmission mode set is configured to the communication node by signaling (any one or a combination of RRC signaling, MAC layer signaling and physical layer signaling).

Example Four

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the first transmission mode set is configured to the communication node by signaling (any one or a combination of RRC signaling, MAC layer signaling and physical layer signaling).

In an exemplary embodiment, the second transmission mode set is configured to the communication node by physical layer signaling.

Example Five

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the transmission manner includes at least one of: transmission pre-coding matrix set, transmission beam set, transmission quasi-co-location relationship set, and transmission power control.

In an exemplary embodiment, the reception manner includes at least one of: reception pre-coding matrix set, reception beam set, and reception quasi-co-location relationship set.

Example Six

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the channel set includes at least one of: a physical downlink control channel, a physical downlink data channel, a physical uplink control channel, a physical uplink data channel, and a physical uplink sounding channel.

It should be noted that the reception beam mentioned in the present disclosure includes at least one of: a reception port, a reception resource, a reference signal sequence, a reception pre-coding matrix (in analog form, digital form, or a combination thereof), a receiver algorithm, and quasi-co-location information.

It should be noted that the transmission beam mentioned in the present disclosure includes at least one of: a transmission port, a transmission resource, a reference signal sequence, a transmission pre-coding matrix (in analog form, digital form, or a combination thereof), a transmitter algorithm, and quasi-co-location information.

It can be seen that, by employing the above solutions, the transmission mode set corresponding to the channel set can be flexibly configured, and the transmission modes can be flexibly configured for the channels in the channel set, thereby solving the problem of variation of transmission of the control channel and transmission mode due to the diversity of environments of the channel in the communication system, and improving the performance of the mobile communication system.

Embodiment Four

Figure 5:
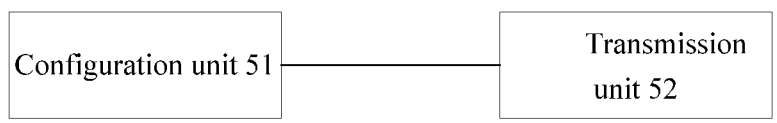
FIG. 5 is a schematic diagram illustrating a structure of a communication node according to an embodiment of the present disclosure.

Based on the above channel configuration methods, the present embodiment of the present disclosure further provides a communication node, and as illustrated in FIG. 5, the communication node includes a configuration unit 51 configured to determine information about a correspondence between a first channel set and a second channel set, and determine a second transmission mode set corresponding to the second channel set according to the correspondence between the first channel set and the second channel set and a first transmission mode set corresponding to the first channel set; and a transmission unit 52 configured to transmit or receive a channel in the second channel set according to the second transmission mode set.

It should be noted that the communication node may be any apparatus having a communication function, such as a network node (e.g., a base station) or a terminal device (e.g., a mobile phone or other terminal devices that are capable of connecting to a communication network).

Further, the N time periods may include only one target time period, or may include two or more time periods. In a case where the N time periods include only one target time period, it may refer to a time duration of the whole communication process, or it may also refer to a cycle, that is to say, prior to each cycle, the communication node performs an operation of determining the target transmission modes of channels in the target channel set once so that the target transmission modes of the target channel set can be adjusted in each cycle. In a case where the N time periods include two or more time periods, the transmission modes may be configured for different time periods, respectively, and the detailed description thereof will be explained in the following embodiments.

The N time periods is the one target time period, and accordingly, the configuration unit is configured to determine the correspondence between the first channel set and the target channel set, and determine, according to the first transmission mode set corresponding to the first channel set, the target transmission mode set corresponding to the target channel set according to the first transmission mode set.

The transmission unit is configured to transmit or receive a channel in the target channel set according to the target transmission mode set in the one target time period.

The first channel set includes an uplink channel and/or a downlink channel. The target channel set includes an uplink channel and/or a downlink channel.

The numbers of elements in the first channel set, the target channel set, the first transmission mode set and the second transmission mode set are A, B, C and D, respectively, where each of A, B, C and D is an integer larger than 0.

The transmission mode includes a transmission manner and/or a reception manner.

Next, the channel configuration method illustrated in the above schematic diagram will be described in detail below in connection with various examples.

Example One

In an exemplary embodiment, the first channel set includes an uplink channel and/or a downlink channel; and the target channel set includes an uplink channel and/or a downlink channel.

In an exemplary embodiment, the numbers of elements in the first channel set, the target channel set, the first transmission mode set and the second transmission mode set are A, B, C and D, respectively, where each of A, B, C and D is an integer larger than 0. Further, A, B, C and D may be the same or may be different.

Example Two

In the step 102 of determining information about a correspondence between a first channel set and a target channel set, a channel in the first channel set is pre-configured, or is obtained by the communication node negotiating with another communication node; a channel in the target channel set is pre-configured, or is obtained by the communication node negotiating with another communication node; the correspondence between the first channel set and the target channel set is pre-configured, or is obtained by the communication node negotiating with another communication node.

Example Three

In the step 102 of determining information about a correspondence between a first channel set and a target channel set, in a case where the first channel set includes at least a physical uplink data channel, the target channel set includes at least a physical uplink control channel.

As illustrated in FIG. 2 and referring to the right side thereof, the starting position of a time domain of the resource used by the physical uplink data channel is not later than the starting position of a time domain of the resource used by the physical uplink control channel; alternatively, referring to the left side of FIG. 2, the resource used by the physical uplink data channel is allocated in the same time slot as the resource used by the physical uplink control channel.

Example Four

The information about the correspondence between the first channel set and the target channel set is determined. In an exemplary embodiment, the first channel set includes at least a physical downlink data channel, and the target channel set includes at least a physical uplink control channel.

The starting position of a time domain of the resource used by the physical downlink data channel is not later than the starting position of a time domain of the resource used by the physical uplink control channel; alternatively, the resource used by the physical downlink data channel is allocated in the same time slot as the resource used by the physical uplink control channel; alternatively, the physical uplink control channel carries content about the physical downlink data channel.

That is to say, the first channel set may include a channel having a direction different from that of a channel in the target channel set. For example, the first channel set in the present embodiment includes the physical downlink data channel, and the target channel set includes the physical uplink control channel.

Example Five

The information about the correspondence between the first channel set and the target channel set is determined. In an exemplary embodiment, the first channel set includes at least a physical downlink control channel, the target channel set includes at least a physical uplink control channel, the starting position of a time domain of the resource used by the physical downlink control channel is not later than the starting position of a time domain of the resource used by the physical uplink control channel; alternatively, the resource used by the physical downlink control channel is allocated in the same time slot as the resource used by the physical uplink control channel; alternatively, the physical uplink control channel carries content about a physical downlink data channel allocated by the physical downlink control channel.

The second transmission mode set for the target channel set is determined according to the first transmission mode set for the first channel set, and the communication node transmits or receives a channel in the target channel set according to the second transmission mode set.

Example Six

The information about the correspondence between the first channel set and the target channel set is determined. In an exemplary embodiment, the first channel set includes at least a physical random access channel, the target channel set includes at least one or a combination of a physical uplink control channel and a physical uplink data channel, and the starting position of a time domain of the resource used by the physical uplink data channel is not later than the starting position of a time domain of the resource used by the physical uplink control channel.

Example Seven

The information about the correspondence between the first channel set and the target channel set is determined. In an exemplary embodiment, the first channel set includes at least a physical downlink control channel, the target channel set includes at least a physical downlink data channel, the starting position of a time domain of the resource used by the physical downlink control channel is not later than the starting position of a time domain of the resource used by the physical downlink data channel; alternatively, the physical downlink control channel allocates the resource used by the physical downlink data channel.

Example Eight

The information about the correspondence between the first channel set and the target channel set is determined. In an exemplary embodiment, the correspondence between the first channel set and the target channel set includes at least one of:
a correspondence between a channel in the first channel set and a channel in the target channel set;
an effective time of the correspondence between the first channel set and the target channel set;
an expiration time of the correspondence between the first channel set and the target channel set; and
a correspondence rule between a channel in the first channel set and a channel in the target channel set.

For example, in a case where the first channel set includes an uplink data channel and a downlink control channel and the target channel set includes an uplink control channel, the communication node preferably determines a transmission mode of the uplink control channel according to a transmission mode of the uplink data channel.

The correspondence between the channels in the first channel set and the channels in the target channel set may be preset.

The correspondence rule may be, for example, an uplink channel in the first channel set corresponding to a downlink channel in the target channel set, or a physical downlink control channel in the first channel set corresponding to a physical downlink data channel in the target channel set. Additionally, the correspondence rule may also characterize a correspondence between time slots for the channels, or a correspondence between frequencies of the channels, etc. It may be set according to practical situations and will not be listed here one by one.

In an exemplary embodiment, the communication node may be notified of the information about the correspondence through physical layer signaling (signal) or high-level signaling. Alternatively, the information about the correspondence may be predefined.

The second transmission mode set for the target channel set is determined according to the first transmission mode set for the first channel set, and the communication node transmits or receives a channel in the target channel set according to the second transmission mode set.

Example Nine

The information about the correspondence between the first channel set and the target channel set is determined.

The second transmission mode set for the target channel set is determined according to the first transmission mode set for the first channel set, and the communication node transmits or receives a channel in the target channel set according to the second transmission mode set. In an exemplary embodiment, the transmission mode includes a transmission manner and/or a reception manner. In an exemplary embodiment, the transmission manner includes at least one of: transmission pre-coding matrix set, transmission beam set, transmission quasi-co-location relationship set, and transmission power control.

It can be seen that, by employing the above solutions, the transmission mode set corresponding to the channel set can be flexibly configured, and the transmission modes can be flexibly configured for the channels in the channel set, thereby solving the problem of variation of transmission of the control channel and transmission mode due to the diversity of environments of the channel in the communication system, and improving the performance of the mobile communication system.

Embodiment Five

Based on the above channel configuration methods, the present embodiment of the present disclosure further provides a communication node, and as illustrated in FIG. 5, the communication node includes a configuration unit 51 configured to configure a target transmission mode set for a target channel set in each of N time periods; and a transmission unit 52 configured to transmit the target channel set in the N time periods, according to the target transmission mode set in each time period.

It should be noted that the communication node may be any apparatus having a communication function, such as a network node (e.g., a base station) or a terminal device (e.g., a mobile phone or other terminal devices that are capable of connecting to a communication network).

Further, the N time periods may include only one target time period, or may include two or more time periods. In a case where the N time periods include only one target time period, it may refer to time duration of the whole communication process, or it may also refer to a cycle, that is to say, prior to each cycle, the communication node performs an operation of determining the target transmission modes of channels in the target channel set once so that the target transmission modes of the target channel set can be adjusted in each cycle. In a case where the N time periods include two or more time periods, the transmission modes may be configured for different time periods, respectively, and the detailed description thereof will be explained in the following embodiments.

The N time periods is the one target time period, and accordingly, the configuration unit is configured to determine the correspondence between the first channel set and the target channel set, and determine, according to the first transmission mode set corresponding to the first channel set, the target transmission mode set corresponding to the target channel set according to the first transmission mode set.

The transmission unit is configured to transmit or receive a channel in the target channel set according to the target transmission mode set in the one target time period.

The first channel set includes an uplink channel and/or a downlink channel. The target channel set includes an uplink channel and/or a downlink channel.

The numbers of elements in the first channel set, the target channel set, the first transmission mode set and the second transmission mode set are A, B, C and D, respectively, where each of A, B, C and D is an integer larger than 0.

The transmission mode includes a transmission manner and/or a reception manner.

Next, the channel configuration method illustrated in the above schematic diagram will be described in detail below in connection with various examples.

Example One

In an exemplary embodiment, the first channel set includes an uplink channel and/or a downlink channel; and the target channel set includes an uplink channel and/or a downlink channel.

In an exemplary embodiment, the numbers of elements in the first channel set, the target channel set, the first transmission mode set and the second transmission mode set are A, B, C and D, respectively, where each of A, B, C and D is an integer larger than 0. Further, A, B, C and D may be the same or may be different.

Example Two

In the step 102 of determining information about a correspondence between a first channel set and a target channel set, a channel in the first channel set is pre-configured, or is obtained by the communication node negotiating with another communication node; a channel in the target channel set is pre-configured, or is obtained by the communication node negotiating with another communication node; the correspondence between the first channel set and the target channel set is pre-configured, or is obtained by the communication node negotiating with another communication node.

Example Three

In the step 102 of determining information about a correspondence between a first channel set and a target channel set, in a case where the first channel set includes at least a physical uplink data channel, the target channel set includes at least a physical uplink control channel.

As illustrated in FIG. 2 and referring to the right side thereof, the starting position of a time domain of the resource used by the physical uplink data channel is not later than the starting position of a time domain of the resource used by the physical uplink control channel; alternatively, referring to the left side of FIG. 2, the resource used by the physical uplink data channel is allocated in the same time slot as the resource used by the physical uplink control channel.

Example Four

The information about the correspondence between the first channel set and the target channel set is determined. In an exemplary embodiment, the first channel set includes at least a physical downlink data channel, and the target channel set includes at least a physical uplink control channel.

The starting position of a time domain of the resource used by the physical downlink data channel is not later than the starting position of a time domain of the resource used by the physical uplink control channel; alternatively, the resource used by the physical downlink data channel is allocated in the same time slot as the resource used by the physical uplink control channel; alternatively, the physical uplink control channel carries content about the physical downlink data channel.

That is to say, the first channel set may include a channel having a direction different from that of a channel in the target channel set. For example, the first channel set in the present embodiment includes the physical downlink data channel, and the target channel set includes the physical uplink control channel.

Example Five

The information about the correspondence between the first channel set and the target channel set is determined. In an exemplary embodiment, the first channel set includes at least a physical downlink control channel, the target channel set includes at least a physical uplink control channel, the starting position of a time domain of the resource used by the physical downlink control channel is not later than the starting position of a time domain of the resource used by the physical uplink control channel; alternatively, the resource used by the physical downlink control channel is allocated in the same time slot as the resource used by the physical uplink control channel; alternatively, the physical uplink control channel carries content about a physical downlink data channel allocated by the physical downlink control channel.

The second transmission mode set for the target channel set is determined according to the first transmission mode set for the first channel set, and the communication node transmits or receives a channel in the target channel set according to the second transmission mode set.

Example Six

The information about the correspondence between the first channel set and the target channel set is determined. In an exemplary embodiment, the first channel set includes at least a physical random access channel, the target channel set includes at least one or a combination of a physical uplink control channel and a physical uplink data channel, and the starting position of a time domain of the resource used by the physical uplink data channel is not later than the starting position of a time domain of the resource used by the physical uplink control channel.

Example Seven

The information about the correspondence between the first channel set and the target channel set is determined. In an exemplary embodiment, the first channel set includes at least a physical downlink control channel, the target channel set includes at least a physical downlink data channel, the starting position of a time domain of the resource used by the physical downlink control channel is not later than the starting position of a time domain of the resource used by the physical downlink data channel; alternatively, the physical downlink control channel allocates the resource used by the physical downlink data channel.

Example Eight

The information about the correspondence between the first channel set and the target channel set is determined. In an exemplary embodiment, the correspondence between the first channel set and the target channel set includes at least one of:

a correspondence between a channel in the first channel set and a channel in the target channel set;

an effective time of the correspondence between the first channel set and the target channel set;

an expiration time of the correspondence between the first channel set and the target channel set; and a correspondence rule between a channel in the first channel set and a channel in the target channel set.

For example, in a case where the first channel set includes an uplink data channel and a downlink control channel and the target channel set includes an uplink control channel, the communication node preferably determines a transmission mode of the uplink control channel according to a transmission mode of the uplink data channel.

The correspondence between the channels in the first channel set and the channels in the target channel set may be preset.

The correspondence rule may be, for example, an uplink channel in the first channel set corresponding to a downlink channel in the target channel set, or a physical downlink control channel in the first channel set corresponding to a physical downlink data channel in the target channel set. Additionally, the correspondence rule may also characterize a correspondence between time slots for the channels, or a correspondence between frequencies of the channels, etc. It may be set according to practical situations and will not be listed here one by one.

In an exemplary embodiment, the communication node may be notified of the information about the correspondence through physical layer signaling (signal) or high-level signaling. Alternatively, the information about the correspondence may be predefined.

The second transmission mode set for the target channel set is determined according to the first transmission mode set for the first channel set, and the communication node transmits or receives a channel in the target channel set according to the second transmission mode set.

Example Nine

The information about the correspondence between the first channel set and the target channel set is determined.

The second transmission mode set for the target channel set is determined according to the first transmission mode set for the first channel set, and the communication node transmits or receives a channel in the target channel set according to the second transmission mode set. In an exemplary embodiment, the transmission mode includes a transmission manner and/or a reception manner. In an exemplary embodiment, the transmission manner includes at least one of: transmission pre-coding matrix set, transmission beam set, transmission quasi-co-location relationship set, and transmission power control.

It can be seen that, by employing the above solutions, the transmission mode set corresponding to the channel set can be flexibly configured, and the transmission modes can be flexibly configured for the channels in the channel set, thereby solving the problem of variation of transmission of the control channel and transmission mode due to the diversity of environments of the channel in the communication system, and improving the performance of the mobile communication system.

Embodiment Six

In the present embodiment, the N time periods include a first time period and a second time period. It should be noted that although two time periods are exemplified in the present embodiment, there may be more time periods in actual cases, for example, the N time periods may further include a third time period, a fourth time period, or the like. The correspondence between channel sets and the transmission mode sets in other time periods may be configured in the same manner as in the first and second time periods, and will not be repeated here.

In an exemplary embodiment, the configuration unit is configured to configure a first transmission mode set to be used in the first time period, and to configure a second transmission mode set to be used in the second time period.

Accordingly, the transmission unit is configured to transmit or receive a first channel set according to the first transmission mode set in the first time period, and to transmit or receive a target channel set according to the second transmission mode set in the second time period Within a time period having the first time period and the second time period, the communication node is configured to transmit or receive a channel set by using the first transmission mode set in the first time period; and the communication node is configured to transmit or receive the channel set by using a second transmission mode set in the second time period.

In an exemplary embodiment, as illustrated in FIG. 4, the intersection of the first time period and the second time period is a null set, the starting time of the first time period is earlier than the starting time of the second time period, the ending time of the first time period is later than the ending time of the second time period, and the transmission mode includes a transmission manner and/or a reception manner. The first time period, as illustrated in FIG. 4, may be adjacent to the second time period; alternatively, the first time period and the second time period, different from those in FIG. 4, may be not adjacent to each other in a time domain, but be spaced apart by a certain time period. In the present embodiment, whether a plurality of time periods are adjacent to each other or spaced apart from each other in a time domain is not limited.

Next, the scenarios provided by the present embodiment will be described in detail below in connection with various examples.

Example One

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the first time period and the second time period are predefined, or are obtained by the communication node negotiating with another communication node.

Example Two

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the first transmission mode set is configured to the communication node by signaling (any one or a combination of RRC signaling, MAC layer signaling and physical layer signaling).

Example Three

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the second transmission mode set is configured to the communication node by signaling (any one or a combination of RRC signaling, MAC layer signaling and physical layer signaling).

Example Four

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the first transmission mode set is configured to the communication node by signaling (any one or a combination of RRC signaling, MAC layer signaling and physical layer signaling).

In an exemplary embodiment, the second transmission mode set is configured to the communication node by physical layer signaling.

Example Five

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the transmission manner includes at least one of: transmission pre-coding matrix set, transmission beam set, transmission quasi-co-location relationship set, and transmission power control.

In an exemplary embodiment, the reception manner includes at least one of: reception pre-coding matrix set, reception beam set, and reception quasi-co-location relationship set.

Example Six

Within a time period having a first time period and a second time period, the communication node is configured to transmit or receive a channel set by using a first transmission mode set in the first time period; and the communication node is configured to transmit or receive the channel set by using a second transmission mode set in the second time period.

In an exemplary embodiment, the channel set includes at least one of: a physical downlink control channel, a physical downlink data channel, a physical uplink control channel, a physical uplink data channel, and a physical uplink sounding channel.

It should be noted that the reception beam mentioned in the present disclosure includes at least one of: a reception port, a reception resource, a reference signal sequence, a reception pre-coding matrix (in analog form, digital form, or a combination thereof), a receiver algorithm, and quasi-co-location information.

It should be noted that the transmission beam mentioned in the present disclosure includes at least one of: a transmission port, a transmission resource, a reference signal sequence, a transmission pre-coding matrix (in analog form, digital form, or a combination thereof), a transmitter algorithm, and quasi-co-location information.

It should be noted that the channel set mentioned in the present disclosure may not only include a channel, but also include a signal (e.g., a channel state information reference signal (CSI-RS), a demodulation reference signal, a sounding signal, a synchronization signal, an accessing signal).

It can be seen that, by employing the above solutions, the transmission mode set corresponding to the channel set can be flexibly configured, and the transmission modes can be flexibly configured for the channels in the channel set, thereby solving the problem of variation of transmission of the control channel and transmission mode due to the diversity of environments of the channel in the communication system, and improving the performance of the mobile communication system.

One of ordinary skill in the art will appreciate that all or part of the steps for implementing the above method embodiments may be implemented by a program instructing a related hardware, and the program may be stored in a computer-readable storage medium, and when executed, perform the steps including the method embodiments described above. The aforementioned storage medium includes various media that can store program codes, such as a removable storage device, a Read-Only Memory (ROM), a Random Access Memory (RAM), a magnetic disk, or an optical disk. Embodiments of the present disclosure provide a computer storage medium having stored thereon computer-executable instructions that, when executed, perform the steps in the method embodiments described above.

An embodiment of the present disclosure further provides a communication node, including at least one processor, a memory, and at least one network interface. The various components are coupled together by a bus system. It will be understood that the bus system is configured to enable the connection and communication between these components. The bus system includes a power bus, a control bus, and a status signal bus in addition to a data bus.

It will be appreciated that the memory in embodiments of the disclosure may be either a volatile memory or a non-volatile memory, or may include both the volatile memory and the nonvolatile memory.

The processor is configured to execute the steps in the foregoing embodiments, which will not be repeated here.

Alternatively, the integrated units described above in the present disclosure may be stored in a computer-readable storage medium if they are implemented in the form of software functional modules and sold or used as separate products. Based on this understanding, the essence, or a part that makes contribution to the existing art, of the technical solutions of the embodiments of the present disclosure may be embodied in the form of a software product, which is stored in a storage medium and includes several instructions to make a computer device (which may be a personal computer, an electronic device, or a network device) perform all or part of the methods described in the embodiments of the present disclosure. The aforementioned storage medium includes various media that can store program codes, such as a removable storage device, a ROM, a RAM, a magnetic disk or an optical disk.

The foregoing describes only specific embodiments of the present disclosure, but the protection scope of the present disclosure is not limited thereto, and any change or substitution that can be easily conceived by a person skilled in the art within the technical scope disclosed in the present disclosure should be covered by the protection scope of the present disclosure. Therefore, the protection scope of the present disclosure should be defined by the protection scope of the claims.

INDUSTRIAL APPLICABILITY

The present disclosure provides a channel configuration method, a communication node and a storage medium that can flexibly configure the transmission mode set corresponding to the channel set, and thus flexibly configure the transmission modes for the channels in the channel set, thereby solving the problem of variation of transmission of the control channel and transmission mode due to the diversity of environments of the channel in the communication system, and improving the performance of the mobile communication system.

What is claimed is:

1. A channel configuration method applied to a communication node and comprising:
determining information about a correspondence between a first channel set and a second channel set;
determining a second transmission mode set corresponding to the second channel set according to the information about the correspondence between the first channel set and the second channel set and a first transmission mode set corresponding to the first channel set; and
transmitting or receiving a channel in the second channel set according to the second transmission mode set,
wherein the first channel set comprises an uplink channel and/or a downlink channel, and the second channel set comprises an uplink channel and/or a downlink channel;
wherein numbers of elements in the first channel set, the second channel set, the first transmission mode set and the second transmission mode set are A, B, C and D, respectively, where each of A, B, C and D is an integer larger than 0; and
wherein a transmission mode in each of the first and second transmission mode sets comprises a transmission manner and/or a reception manner.

2. The method of claim 1, wherein a channel in the first channel set is pre-configured, or is obtained by the communication node negotiating with another communication node;
wherein the channel in the second channel set is pre-configured, or is obtained by the communication node negotiating with another communication node; and
wherein the correspondence between the first channel set and the second channel set is pre-configured, or is obtained by the communication node negotiating with another communication node.

3. The method of claim 1, wherein the first channel set comprises at least a physical uplink data channel, the second channel set comprises at least a physical uplink control channel; wherein a starting position of a time domain of a resource used by the physical uplink data channel is not later than a starting position of a time domain of a resource used by the physical uplink control channel, or the resource used by the physical uplink data channel is allocated in the same time slot as the resource used by the physical uplink control channel; or
wherein the first channel set comprises at least a physical downlink data channel, and the second channel set comprises at least a physical uplink control channel, wherein a starting position of a time domain of a resource used by the physical downlink data channel is not later than a starting position of a time domain of a resource used by the physical uplink control channel, or the resource used by the physical downlink data channel is allocated in the same time slot as the resource used by the physical uplink control channel, or the physical uplink control channel carries content about the physical downlink data channel;
or
wherein the first channel set comprises at least a physical downlink control channel, and the second channel set comprises at least a physical uplink control channel; wherein a starting position of a time domain of a resource used by the physical downlink control channel is not later than a starting position of a time domain of a resource used by the physical uplink control channel; or the resource used by the physical downlink control channel is allocated in the same time slot as the resource used by the physical uplink control channel; or the physical uplink control channel carries content about a physical downlink data channel allocated by the physical downlink control channel;

or wherein the first channel set comprises at least a physical random access channel, and the second channel set comprises at least one or a combination of a physical uplink control channel and a physical uplink data channel;

or wherein the first channel set comprises at least a physical downlink control channel, and the second channel set comprises at least a physical downlink data channel; wherein a starting position of a time domain of a resource used by the physical downlink control channel is not later than a starting position of a time domain of a resource used by the physical downlink data channel.

4. The method of claim 1, wherein the correspondence between the first channel set and the second channel set comprises at least one of:

a correspondence between a channel in the first channel set and a channel in the second channel set;

an effective time of the correspondence between the first channel set and the second channel set;

an expiration time of the correspondence between the first channel set and the second channel set; and a correspondence rule between a channel in the first channel set and a channel in the second channel set.

5. The method of claim 1, wherein the transmission manner comprises at least one of: transmission pre-coding matrix set, transmission beam set, transmission quasi-co-location relationship set, and transmission power control; and/or the reception manner comprises at least one of: reception pre-coding matrix set, reception beam set, and reception quasi-co-location relationship set.

6. A channel configuration method applied to a communication node and comprising:

within a time period having a first sub-time period and a second sub-time period, configuring the communication node to transmit or receive a channel set by using a first transmission mode set in the first sub-time period; and configuring the communication node to transmit or receive the channel set by using a second transmission mode set in the second sub-time period;

wherein an intersection of the first sub-time period and the second sub-time period is a null set, a starting time of the first sub-time period is earlier than a starting time of the second sub-time period, an ending time of the first sub-time period is later than an ending time of the second sub-time period, and a transmission mode in each of the first and second transmission mode sets comprises a transmission manner and/or a reception manner.

7. The method of claim 6, wherein the first sub-time period and the second sub-time period are predefined, or are obtained by the communication node negotiating with another communication node;

wherein the first transmission mode set is configured to the communication node by high-level signaling and/or MAC layer signaling; and wherein the second transmission mode set is configured to the communication node by physical layer signaling.

8. The method of claim 6, wherein the transmission manner comprises at least one of: transmission pre-coding matrix set, transmission beam set, transmission quasi-co-location relationship set, and transmission power control; and wherein the reception manner comprises at least one of: reception pre-coding matrix set, reception beam set, and reception quasi-co-location relationship set.

9. The method of claim 6, wherein the channel set comprises at least one of: a physical downlink control channel, a physical downlink data channel, a physical uplink control channel, a physical uplink data channel, and a physical uplink sounding channel.

10. A communication node, comprising a processor and a storage having a computer program stored thereon which, when being executed by the processor causes the processor to:

determimne information about a correspondence between a first channel set and a second channel set, and determine a second transmission mode set corresponding to the second channel set according to the correspondence between the first channel set and the second channel set and a first transmission mode set corresponding to the first channel set; and transmit or receive a channel in the second channel set according to the second transmission mode set, wherein the first channel set comprises an uplink channel and/or a downlink channel, and the second channel set comprises an uplink channel and/or a downlink channel;

wherein numbers of elements in the first channel set, the second channel set, the first transmission mode set and the second transmission mode set are A, B, C and D, respectively, where each of A, B, C and D is an integer larger than 0; and wherein a transmission mode in each of the first and second transmission mode sets comprises a transmission manner and/or a reception manner.

11. The communication node of claim 10, wherein a channel in the first channel set is pre-configured, or is obtained by the communication node negotiating with another communication node;

wherein the channel in the second channel set is pre-configured, or is obtained by the communication node negotiating with another communication node; and wherein the correspondence between the first channel set and the second channel set is pre-configured, or is obtained by the communication node negotiating with another communication node.

12. The communication node of claim 10, wherein the first channel set comprises at least a physical uplink data channel, the second channel set comprises at least a physical uplink control channel; and wherein a starting position of a time domain of a resource used by the physical uplink data channel is not later than a starting position of a time domain of a resource used by the physical uplink control channel, or the resource used by the physical uplink data channel is allocated in the same time slot as the resource used by the physical uplink control channel;

or wherein the first channel set comprises at least a physical downlink data channel, and the second channel set comprises at least a physical uplink control channel, wherein a starting position of a time domain of a resource used by the physical downlink data channel is not later than a starting position of a time domain of a resource used by the physical uplink control channel, or the resource used by the physical downlink data channel is allocated in the same time slot as the resource used by the physical uplink control channel, or the physical uplink control channel carries content about the physical downlink data channel;

or wherein the first channel set comprises at least a physical downlink control channel, and the second channel set comprises at least a physical uplink control channel; and wherein a starting position of a time domain of a resource used by the physical downlink control channel is not later than a starting position of a time domain of a resource used by the physical uplink control channel; or the resource used by the physical downlink control channel is allocated in the same time slot as the resource used by the physical uplink control channel; or the physical uplink control channel carries content about a physical downlink data channel allocated by the physical downlink control channel;

or wherein the first channel set comprises at least a physical random access channel, and the second channel set comprises at least one or a combination of a physical uplink control channel and a physical uplink data channel;

or wherein the first channel set comprises at least a physical downlink control channel, and the second channel set comprises at least a physical downlink data channel; and wherein a starting position of a time domain of a resource used by the physical downlink control channel is not later than a starting position of a time domain of a resource used by the physical downlink data channel.

13. The communication node of claim 10, wherein the correspondence between the first channel set and the second channel set comprises at least one of:

a correspondence between a channel in the first channel set and a channel in the second channel set;

an effective time of the correspondence between the first channel set and the second channel set;

an expiration time of the correspondence between the first channel set and the second channel set; and a correspondence rule between a channel in the first channel set and a channel in the second channel set.

14. The communication node of claim 10, wherein the transmission manner comprises at least one of: transmission pre-coding matrix set, transmission beam set, transmission quasi-co-location relationship set, and transmission power control; and/or the reception manner comprises at least one of: reception pre-coding matrix set, reception beam set, and reception quasi-co-location relationship set.

15. A communication node, comprising a processor and a storage having a computer program stored thereon which, when being executed by the processor, causes the processor to configure the communication node by using the method of claim 6.

16. The communication node of claim 15, wherein the first sub-time period and the second sub-time period are predefined, or are obtained by the communication node negotiating with another communication node;

wherein the first transmission mode set is configured to the communication node by high-level signaling and/or MAC layer signaling; and wherein the second transmission mode set is configured to the communication node by physical layer signaling.

17. The communication node of claim 16, wherein the transmission manner comprises at least one of: transmission pre-coding matrix set, transmission beam set, transmission quasi-co-location relationship set, and transmission power control;

wherein the reception manner comprises at least one of: reception pre-coding matrix set, reception beam set, and reception quasi-co-location relationship set.

18. The communication node of claim 16, wherein the channel set comprises at least one of: a physical downlink control channel, a physical downlink data channel, a physical uplink control channel, a physical uplink data channel, and a physical uplink sounding channel.

19. A storage medium, comprising a set of computer-executable instructions configured to perform a step of the method according to claim 1.

* * * * *